C. KNUTSON.
SELF TURNING HARROW CART.
APPLICATION FILED OCT. 6, 1913.
1,115,318.
Patented Oct. 27, 1914.
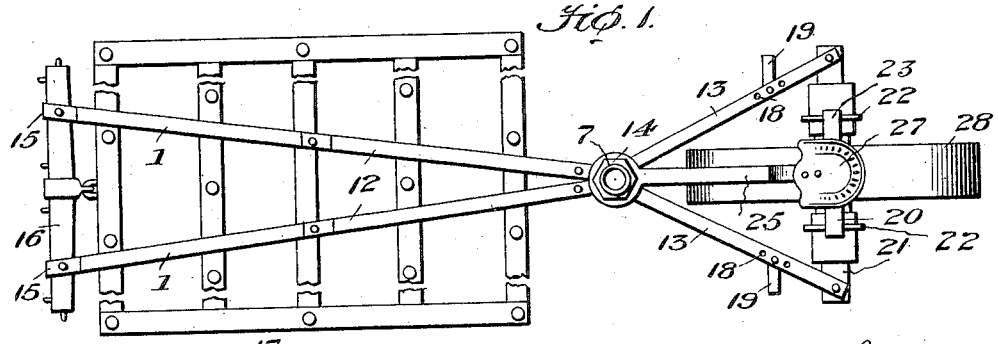
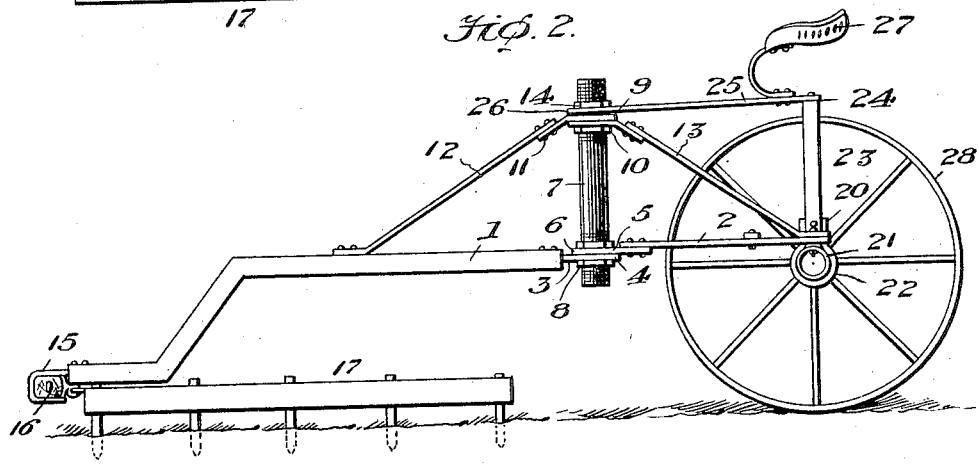
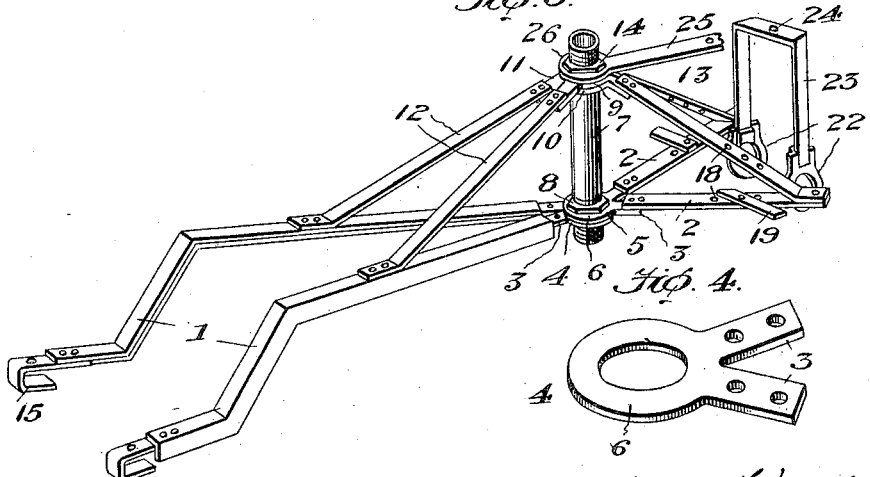
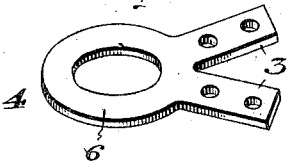
Inventor
Carl Knutson

UNITED STATES PATENT OFFICE.

CARL KNUTSON, OF HUDSON, SOUTH DAKOTA.

SELF-TURNING HARROW-CART.

1,115,318.  Specification of Letters Patent.  Patented Oct. 27, 1914.

Application filed October 6, 1913. Serial No. 793,645.

*To all whom it may concern:*

Be it known that I, CARL KNUTSON, a citizen of the United States, residing at Hudson, county of Lincoln, and State of South Dakota, have invented certain new and useful Improvements in Self-Turning Harrow-Carts, of which the following is a specification.

This invention relates to self-turning harrow carts.

My invention relates to trailing, wheeled self-turning carts or riding attachments for drag harrows which enable the driver of the harrow team to ride, instead of walking.

My object is to provide a harrow cart having an improved frame construction by which it is rendered very strong and durable, and is relatively light, simple, and can be manufactured at lower cost than usual, further, to so construct and connect it to the harrow evener that it may be positioned relatively close to the harrow and minimize the pull required to draw it along.

In my harrow cart, the frame consists of lower front and rear parts or members converging to an upright pivot connector, and sets of converging upper braces connecting the lower members to said pivot connector, the whole constituting a trussed frame, the forward part of which is adapted for attachment to the evener or doubletree of the draft appliance and the rear part having means, preferably including a brace and a yoke, to which are connected the ground wheel and the driver's seat.

In the accompanying drawings: Figure 1 is a plan view showing the invention applied to a drag harrow, the latter being broken away at certain points; Fig. 2, a side elevation thereof; Fig. 3, a perspective of the frame braces, yoke and foot rests only; and Fig. 4, a detail of one of the attachment plates.

The frame consists, mainly, of two front rearwardly converging members 1 and two rear forwardly converging members 2. All of these may be of either flat or angle-iron construction. I have shown the members 1 of angle-iron form as this is preferable, on account of their length, as giving them greater strength.

The members 1 are connected to the ears 3 of an attachment plate 4 (Fig. 4) and members 2 are connected to a similar plate 5. The plates 4, 5, have circular parts 6. The front and rear portions of the frame are pivotally connected together by an upright tube or rod 7 which passes loosely through the parts 6, the latter being in superposed relation and held to the pivot connector 7 by any suitable means such, for instance, as nuts 8 above and below them, on screw-threaded parts of the connector 7. Loosely encircling the upper part of the connector 7 are other attachment plates 9, 10, similar to that of Fig. 4, except that their ears 11 are downwardly inclined. Braces 12 connect the front members 1 to the ears 11 of plate 9 and braces 13 connect the rear members 2 to the ears 11 of the other plate 10. The plates 9, 10 are in superposed relation, with their circular parts held loosely between confining means, such as nuts 14 on screw-threaded parts of the connector 7. The front and rear members 1, 2, in connection with the braces 12, 13, and connector 7, constitute a trussed, articulated frame which, by reason of its being in the form of a truss, possesses great strength and durability and, consequently, the parts thereof may be made of comparatively light material.

The attachment plates afford a relatively wide bearing, permitting ease of turning of the rear part of the frame and the adjustability of the nuts permits any tightening, adjustment, or spreading of the truss necessary to take up wear or provide for suitable relative rigidity of the braces and front and rear members. The front members 1 have clevises 15 for attachment to the draft bar, evener, or doubletree 16. The members 1 are not connected to the drag harrow 17, as usual with harrow carts, but direct attachment to the draft appliance lightens the pull of the horses necessary to draw along the cart and makes the draft lighter than would be the case were the harrow cart connected to the harrow. The rear members 2 and the rear braces 13 are provided with holes 18 for the connection of foot rests 19 which may be attached either to the members 2 or to said braces, and suitably adjusted, forwardly or rearwardly, according to the length of the legs of the driver.

Connected to the rear members 2 by the fastening 20 is a stationary tubular axle 21 (Fig. 2) which also braces said members. Encircling said axle are the collars 22 (Fig. 3) to which the yoke or arch 23 is connected. Secured to the yoke at 24 is a brace 25 whose forward end 26 encircles the connector 7 and is retained by the nuts 14. The seat 27 is carried by said brace 25. By adjusting the foot rests 19, the driver may straddle the brace 25 and comfortably support his legs. A single trailer wheel 28 is loosely mounted on axle 21 between the collars 22. As the cart trails along, the front and rear frame parts pivot on the connector 7 and the wheel 28 and the rear frame parts turn, one way or the other, according to the course taken by the team, the action being quicker than if the cart were directly connected to the harrow.

Having thus described my invention, what I claim as new and desire to secure by Letters Patent, is:—

A self-turning harrow cart having a frame composed of front and rear sections, each having converging lower members arranged in substantially the same plane, an upright pivot-connector to which the members of both sections converge from opposite sides of said pivot-connector and by which they are pivotally connected together, sets of upper braces respectively connected at their lower ends to the members of the front and rear sections and converging upwardly and connected to the pivot-connector above the point of connection of the lower members of the front and rear sections to said pivot-connector, said sections, braces, and pivot-connector constituting a truss of which the pivot-connector is the strut, an arch whose legs are connected to the rear ends of divergent members of the rear sections, a brace connecting the crown of the arch to the pivot-connector, a seat supported by the brace, and a wheel for supporting the arch.

In testimony whereof, I hereunto affix my signature in presence of two witnesses.

CARL KNUTSON.

Witnesses:
AL. ANDERSON,
LARS J. GRINAGER.

Copies of this patent may be obtained for five cents each, by addressing the "Commissioner of Patents, Washington, D. C."